United States Patent [19]

Morimura

[11] 4,244,323
[45] Jan. 13, 1981

[54] APPARATUS FOR FLOATING AND SINKING FISH BREEDING NETTED TANKS

[75] Inventor: Shinji Morimura, Yokohama, Japan

[73] Assignee: Bridgestone Tire Company Limited, Tokyo, Japan

[21] Appl. No.: 32,846

[22] Filed: Apr. 24, 1979

[30] Foreign Application Priority Data

| May 11, 1978 [JP] | Japan | 53-54948 |
| Jun. 10, 1978 [JP] | Japan | 53-69388 |
| Sep. 19, 1978 [JP] | Japan | 53-128413[U] |
| Sep. 29, 1978 [JP] | Japan | 53-120975 |
| Oct. 24, 1978 [JP] | Japan | 53-145224[U] |

[51] Int. Cl.³ .......................................... A01K 61/00
[52] U.S. Cl. ...................................... 119/3; 43/102
[58] Field of Search ................. 119/3, 2, 4; 9/8 R; 114/222; 43/102

[56] References Cited

U.S. PATENT DOCUMENTS

| 1,761,365 | 6/1930 | Reed | 43/102 |
| 3,114,920 | 12/1963 | Delaruelle et al. | 9/8 R |
| 3,852,908 | 12/1974 | Christopher | 43/102 |
| 4,092,797 | 6/1978 | Azurin | 43/102 |
| 4,137,869 | 2/1979 | Kipping | 119/3 |
| 4,147,130 | 4/1979 | Goguel | 119/3 |

Primary Examiner—Hugh R. Chamblee
Attorney, Agent, or Firm—Sughrue, Rothwell, Mion, Zinn & Macpeak

[57] ABSTRACT

An apparatus for floating and sinking fish breeding netted tanks comprising a floating and sinking mechanism composed of a flexible bag enclosed in a tubular frame and adapted to be supplied with a fluid under pressure and to remove it so as to float and sink the fish breeding netted tank.

5 Claims, 14 Drawing Figures

FIG_1 PRIOR ART
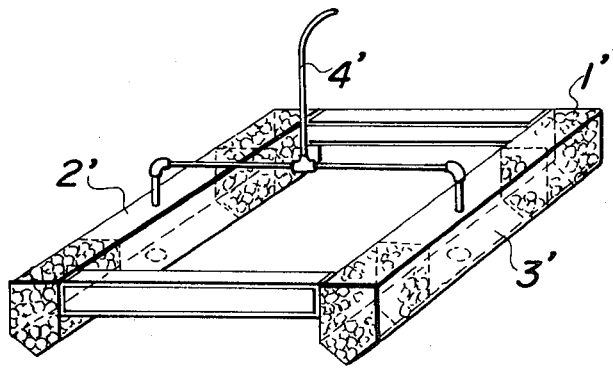
FIG_2
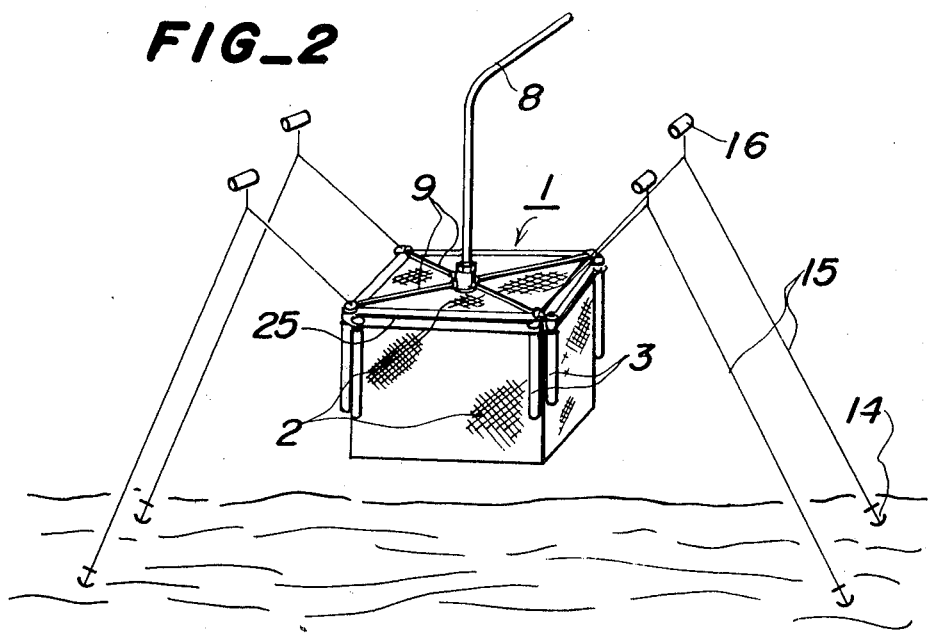

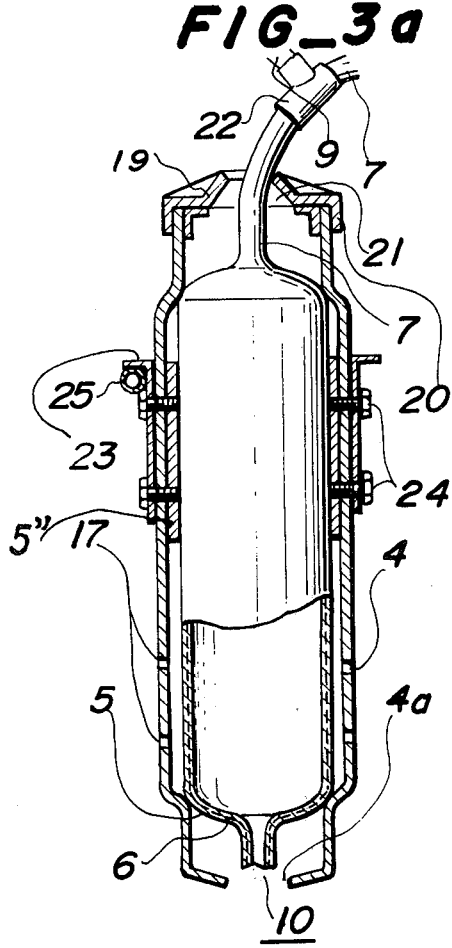
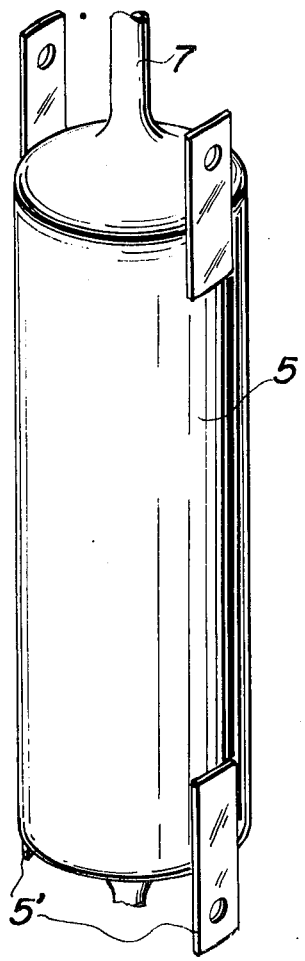

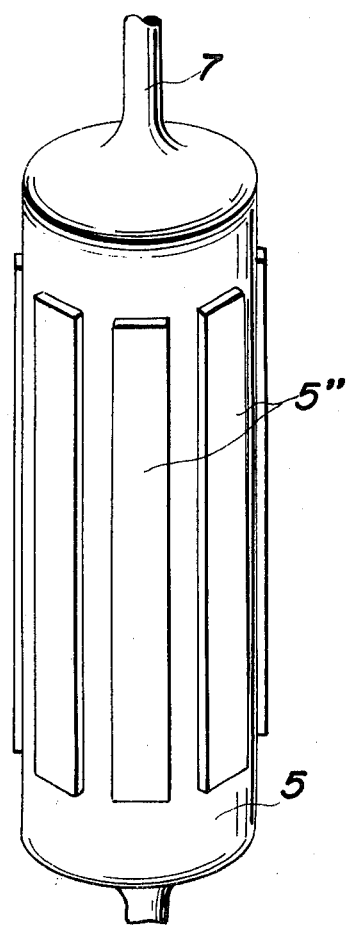
FIG_3c

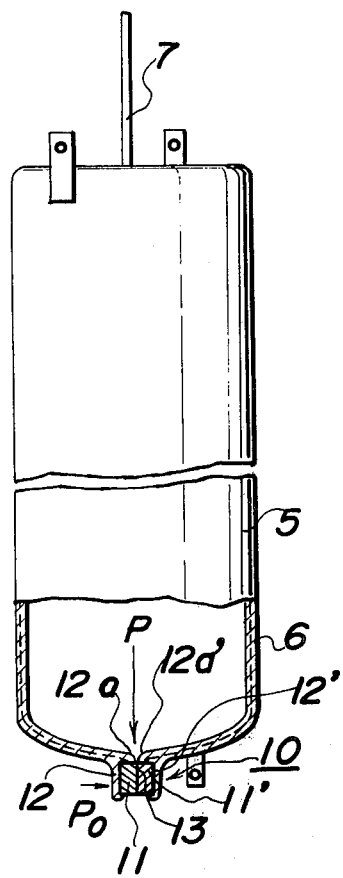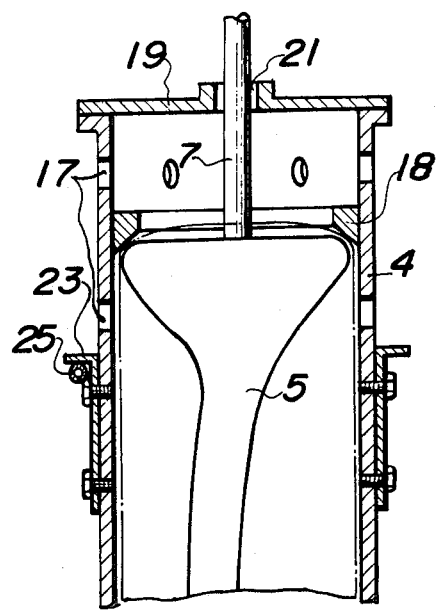

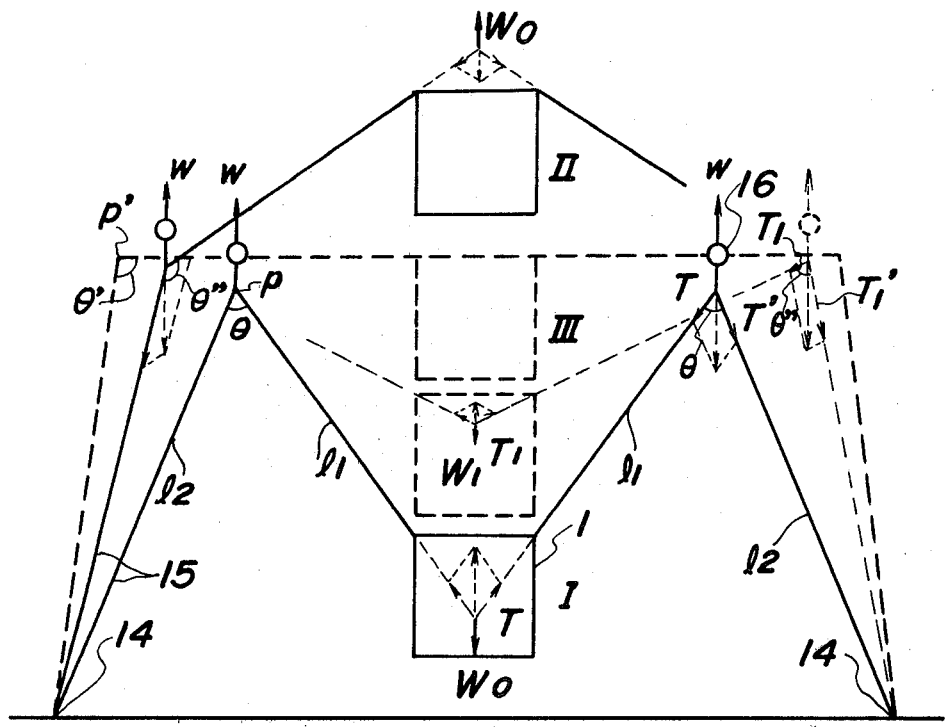
FIG_6

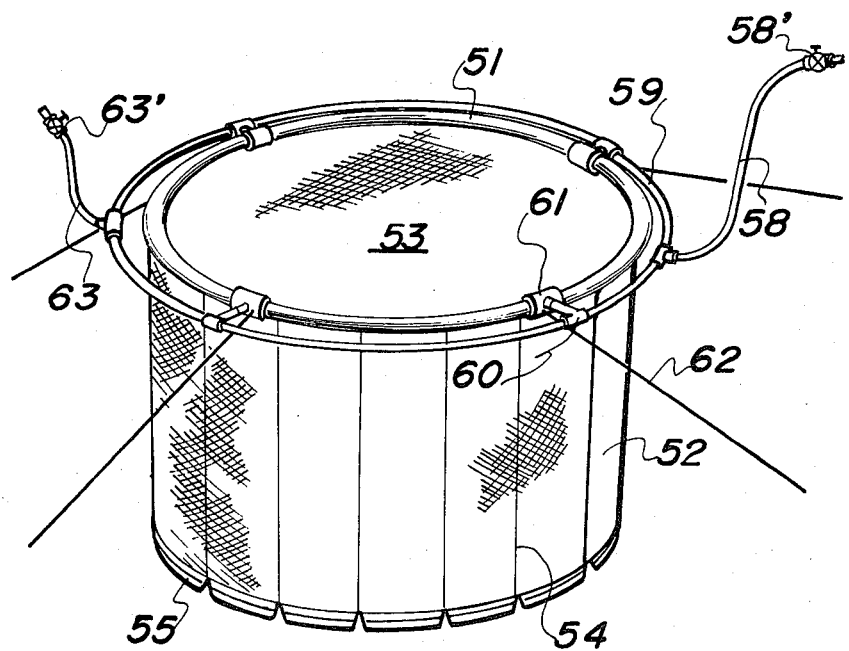
FIG_7
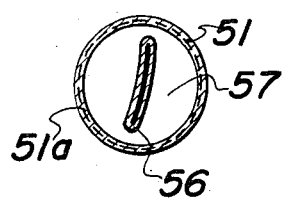
FIG_8a
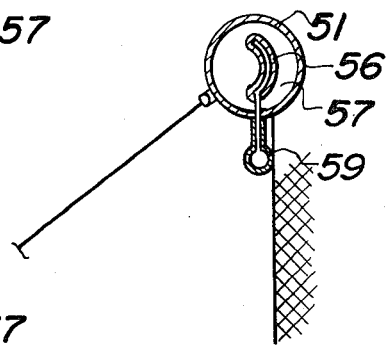
FIG_9
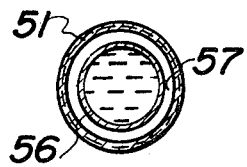
FIG_8b

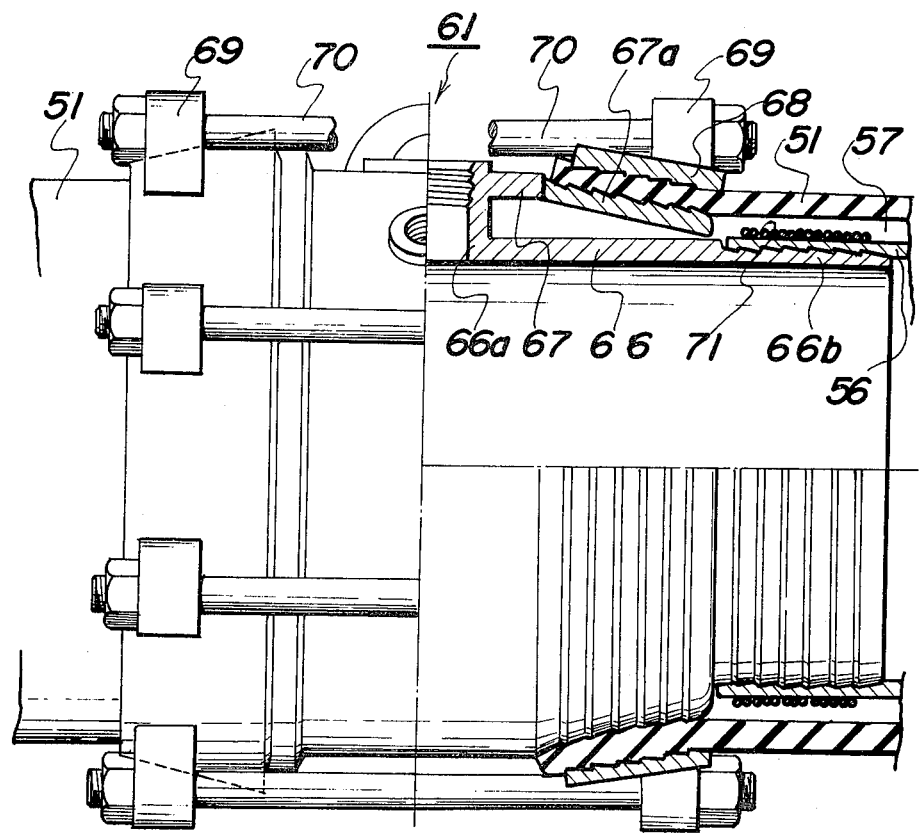
FIG_10

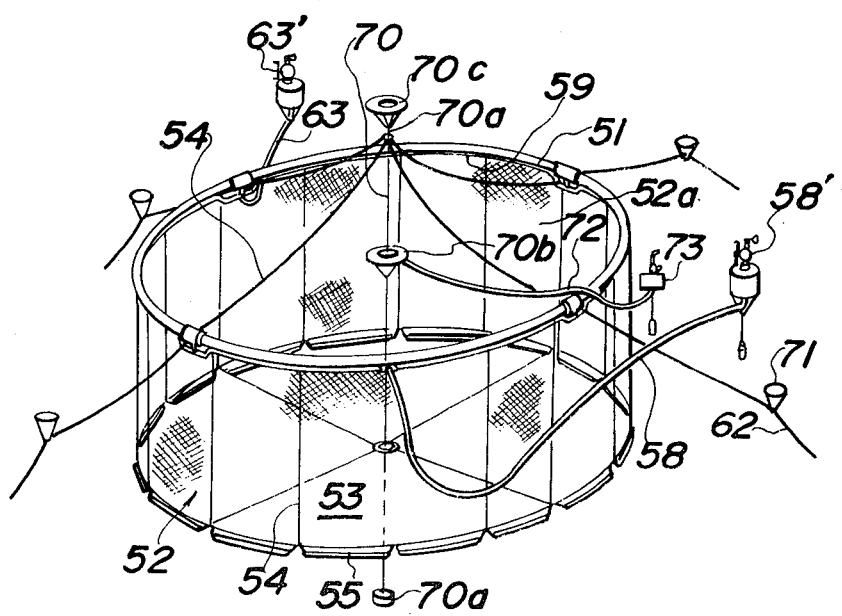

APPARATUS FOR FLOATING AND SINKING FISH BREEDING NETTED TANKS

BACKGROUND OF THE INVENTION

1. Field of the Invention

This invention relates to an apparatus for floating and sinking fish breeding netted tanks.

2. Description of the Prior Art

In the sea age of 200 sea miles, breeding industry for fishes and shellfishes is becoming ever developing. The conventional fish breeding netted tank is composed of a raft framework adapted to be floated on the sea and surrounded by a netted body. Such conventional fish breeding netted tank is very simple in construction. As a result, if it is used in the ocean in which the waves are high, the raft framework tends to be easily broken. In addition, it is impossible to sink the fish breeding netted tank deep under water, thereby weakening the fishes in the fish breeding netted tank. Thus, such conventional fish breeding netted tank could not be used in the ocean and the use thereof is limited to that sea region which is inside a bay or along the shore, and as a result, there is a risk of oxygen being decreased or the sea long the shore being polluted by decaying ground-bait.

In order to render it possible to use the fish breeding netted tank in the ocean, it has been required to avoid the damage subjected to it when it is used when the weather is rough. For this purpose, various kinds of apparatus for floating and sinking the fish breeding netted tanks have been developed.

In one of such conventional apparatus, the fish breeding netted tank is suspended from a supporting frame composed of adjustable float chambers adapted to be alternately filled with air and sea water for the purpose of floating the supporting frame on the sea surface and of sinking it deep under water. Such frame-shaped float chambers are small in height, so that in the case of replacing the air by the sea water or the vice versa, the left and right float chambers become easily unbalanced. As a result, when the float chambers are operated to be floated and sunk, the fish breeding netted tank becomes unstable and swings. In addition, there is a risk of a fitting portion of an air inlet and outlet pipe being removed from the float chamber.

In addition, a fish breeding technique which is high in yield has recently been required to be developed. For this purpose, the fish breeding netted tank must be large in size. In the conventional fish breeding netted tank in which the strength against the waves or the like is dependent on the rigidity of the supporting frame, if the fish breeding netted tank is made large in size, the strength of the supporting frame must also be made excessively large and hence the supporting frame becomes expensive. Thus, the practical use of such large type conventional fish breeding netted tank has been limited.

In addition, if the fish breeding netted tank is totally covered with a netted body and that portion of the netted body which constitutes a ceiling is located on the water surface, such netted portion not only prevents ground-bait from scattering for the fishes but also becomes easily broken.

In another conventional apparatus for floating and sinking fish breeding netted tanks, a float chamber composed of an elongate flexible bag is suspended from a supporting frame with the lengthwise direction of the flexible bag made vertical. In such conventional apparatus, if the fish breeding netted tank is refloated from its sunken state and the water pressure difference between the upper and lower portions of the flexible bag causes the lower portion to expand under a pressure which is higher than a required pressure, the upper portion becomes excessively expanded. In addition, if the fish breeding netted tank is caught in obstacles in the sea and could not be refloated from its sunken state, there is a risk of the flexible bag being broken by excessive air supplied thereinto for the purpose of refloating it by mistake that the flexible bag is in need of added buoyancy.

SUMMARY OF THE INVENTION

An object of the invention, therefore, is to provide an apparatus for floating and sinking fish breeding netted tanks which can balance a float held under the sea surface with that weight of the fish breeding netted tank under water which is obtained by subtracting the buoyancy thereof from the weight of the fish breeding netted tank and hence not only can freely control the floating and sinking speeds of the fish breeding netted tank but also can hold the fish breeding netted tank at any desired depth under water.

Another object of the invention is to provide an apparatus for floating and sinking fish breeding netted tanks having an effectively improved durability.

A further object of the invention is to provide an apparatus for floating and sinking fish breeding netted tanks which is less expensive and high in yield.

A still further object of the invention is to provide an apparatus for floating and sinking fish breeding netted tanks which can effectively avoid damage of a float even when it is supplied with an excessive amount of fluid.

A feature of the invention is the provision of an apparatus for floating and sinking fish breeding netted tanks comprising a fish breeding netted tank body totally covered with a netted body; anchors disposed on the sea-bottom; mooring cables for connecting said mooring anchors to said fish breeding netted tank; buoyancy bodies each connected to an intermediate portion of said mooring cable and always holding said intermediate portion of said mooring cable under the sea surface; a floating and sinking mechanism secured to said fish breeding netted tank body and adapted to supply fluid into said fish breeding netted tank body and removing said fluid therefrom, said floating and sinking mechanism controlling a depth and rising and lowering speeds of said fish breeding netted tank with the buoyancy of said buoyancy body kept in balance with the weight under water of said fish feeding netted tank.

Further objects and features of the invention will be fully understood from the following detailed description with reference to the accompanying drawings, in which:

BRIEF DESCRIPTION OF THE DRAWINGS

FIG. 1 is a perspective view of a conventional apparatus for floating and sinking fish breeding netted tanks;

FIG. 2 is a perspective view of an apparatus for floating and sinking fish breeding netted tanks according to the invention held under water;

FIG. 3a is a cross-sectional view of a floating and sinking mechanism according to the invention;

FIGS. 3b and 3c are perspective views of two embodiments of a flexible bag according to the invention;

FIG. 4 is a front elevational view of another embodiment of a flexible bag according to the invention, a lower portion and valve of which being shown in section;

FIG. 5 is a cross-sectional view of a further embodiment of a flexible bag according to the invention;

FIG. 6 is a diagrammatic view illustrating the operation of a floating and sinking mechanism according to the invention;

FIG. 7 is a perspective view of another embodiment of a fish breeding netted tank according to the invention;

FIG. 8a is a cross-sectional view of a tubular frame under a condition taken when a fish breeding netted tank is floated;

FIG. 8b is a similar view when the fish breeding netted tank is sunk;

FIG. 9 is a cross-sectional view of a modified embodiment of an annular water distribution tube;

FIG. 10 is a front elevational view of a double tube coupling showing in an enlarged scale and partly in section; and FIG. 11 is a perspective view of a further embodiment of a fish breeding netted tank according to the invention.

DETAILED DESCRIPTION OF THE PREFERRED EMBODIMENTS

FIG. 1 shows a conventional apparatus for floating and sinking fish breeding netted tanks.

In such conventional apparatus, a fish breeding netted tank is suspended from a supporting frame 1' and composed of two spaced apart and opposed netted tanks which are provided at their centers with adjustable buoyancy chambers 2', 3', respectively. These adjustable buoyancy chambers 2', 3' are of substantially rectangular shaped framework and small in depth, so that in the case of replacing air by sea water or vice versa, the left and right chambers become easily unbalanced. In addition, in the case of floating and sinking the fish breeding netted tank, it becomes unstable and tends to be swung. Moreover, there is a risk of a metal fitting member of an air inlet and outlet tube 4' being removed from the latter.

FIG. 2 is a perspective view of a fish breeding netted tank according to the invention under submerged condition. Referring to FIG. 2, reference numeral 1 designates a rectangular fish breeding netted tank, 2 a netted body covering all over the tank 1 and formed of a wire net, fishing-net or the like, 3 floating and sinking mechanisms arranged at upper portion of four corners of the tank, respectively, and 25 is a tubular frame.

FIG. 3a shows a floating and sinking mechanism 3 in section. The floating and sinking mechanism 3 is composed of a cylindrical protective sleeve 4 formed of a synthetic resin such as vinyl chloride resin or the like and an extensible and compressible bag, that is, a flexible bag 5 enclosed in the cylindrical protective sleeve 4. The flexible bag 5 is formed of a hermetically sealed fabric such as a rubberized canvas or the like or of rubber provided with a reinforcing layer 6 formed of fibre and embedded in rubber. The flexible bag 5 is provided at its upper end with a gas inlet and outlet tube 7 which is connected through a branch pipe 9 and an air inlet and outlet tube 8 to a pump (not shown) on the sea surface which functions to supply air to the flexible bag 5 and remove air therefrom.

The flexible bag 5 is provided at its lower end with a valve 10 which functions to remove the internal air when the internal pressure of the flexible bag 5 exceeds a required pressure so as to always maintain the internal pressure of the flexible bag 5 within the required pressure.

FIG. 4 shows the lower portion of the flexible bag 5 provided with the valve 10 in section. The valve 10 is composed of a pair of opposed sealing rubber pieces 11, 11' and a socket 12 made integral with an extension of the flexible bag 5 and surrounding the sealing rubber pieces 11, 11'. The sealing rubber pieces 11, 11' are provided at their opposed junction with an opening and closing portion 13. The socket 12 is provided at its base with a V-shaped depression having two side surfaces 12a, 12a' converged toward the opening and closing portion 13 so as to easily deliver any excessive air through the opening and closing portion 13.

The protective sleeve 4 has an internal diameter which can allow to loosely enclose the flexible bag 5 therein. The protective sleeve 4 is provided with a number of holes 17 communicated with a space formed between the protective sleeve 4 and the flexible bag 5. The lower end of the protective sleeve 4 may be made open.

As shown in FIG. 5, the protective sleeve 4 is provided at its upper inner periphery with a stop ring 18 adapted to be engaged with the upper peripheral edge of the flexible bag 5.

The stop ring 18 is formed of a synthetic resin, metal, rubber or the like and may be secured to the inner surface of the protective sleeve 4 or may be made integral with the latter. In FIGS. 3a and 5, reference numeral 19 designates an upper cover of the protective sleeve 4, 20 a fitting flange, 21 an opening through which is extended the gas inlet and outlet tube 7, 22 a tube coupling, 23 a bracket for securing the protective sleeve 4 to the tubular frames 25 and 24 a bolt for securing the bracket 23 to the protective sleeve 4. The flexible bag 5 may be secured to the protective sleeve 4 by means of short strips 5' as shown in FIG. 3b or may be provided around its periphery with a plurality of equi-distantly separated long strips 5" for the purpose of separating the flexible bags 5 from the inner surface of the protective sleeve 4 when the flexible bag 5 is inflated.

The flexible bag 5 becomes inflated when gas is filled therein as shown by dot-dash lines in FIG. 5 and becomes shrunk when the gas is exhausted therefrom as shown by a full line in FIG. 5. If the flexible bag 5 is inflated, its upper end becomes engaged with the stop ring 18, and as a result, the buoyancy is transmitted from the protective sleeve 4 to the tubular frame 25, thereby floating the fish breeding netted tank 1. Conversely, if the flexible bag 5 is deflated, the weight of the fish breeding netted tank 1 under water causes it to sink. The holes 17 provided in the protective sleeve 4 permit the flexible bag 5 to freely expand and contract. When the flexible bag 5 is inflated, a difference between water levels at the upper and lower end surfaces thereof results in an upwardly directing thrust due to the use of the longitudinally elongate flexible bag. This upwardly directing thrust causes the upper end of the flexible bag 5 to urge against the stop ring 18.

If the flexible bag 5 becomes inflated to urge its outer periphery against the inner periphery of the protective sleeve 4, the frictional force produced therebetween causes the internal pressure to increase further. As a result, the upper end of the flexible bag 5 becomes raised above the dot-dash line position shown in FIG. 5, thereby pushing the upper cover 19 upwardly and hence damaging it. The use of the stop ring 18, however, can prevent such excessive rise of the upper end of the flexible bag 5.

The protective sleeve 4 is provided at that portion thereof which is located above the stop ring with a hole 17 for the purpose of avoiding the excessive rise of the pressure of the sea water enclosed in a space formed between the stop ring 18 and the upper cover 19 when the flexible bag 5 becomes inflated.

Referring again to FIG. 2, reference numeral 14 designates an anchor disposed on the sea bottom, 15 a mooring cable for connecting the anchor 14 to four corner shoulder portions of the fish breeding netted tank 1 and 16 a buoyancy body connected to the intermediate portion of the cabe 15 and maintaining the fish breeding netted tank 1 under submerged condition. The buoyancy body 16 may be composed of a porous or foamed filler which is cylindrical, spherical or any other suitable configuration in shape. As a result, the buoyancy body 16 can produce a constant buoyancy which can maintain the fish breeding netted tank 1 under submerged condition irrespective of the floating and sinking conditions thereof.

The floating and sinking mechanism for fish breeding netted tank according to the invention will now be described with reference to FIG. 6.

Referring to FIG. 6, reference numeral I designates a position of the fish breeding netted tank 1 taken by it when the flexible bag 5 is deflated, that is, when the flexible bag 5 becomes large in weight and hence sunk. In this case, the floating and sinking mechanism is subjected to forces produced due to the submerged weight $W_0$ of the fish breeding netted tank 1, buoyancy w of the buoyancy body 16 and tensions T, T' subjected to the mooring cable 15. In this case, the resultant force of the tension T for supporting the submerged weight $W_0$ of the fish breeding netted tank 1 and the tension T' is balanced with the buoyancy w of the buoyancy body 16, thereby maintaining the fish breeding netted tank 1 in its stationary condition in both horizontal and vertical directions.

The anchor 14 is located at such a position that the mooring cable 15 makes an acute angle $\theta$ at the top thereof connected to the buoyancy body 16.

Reference numeral II designates a position of the fish breeding netted tank 1 taken by it when the flexible bag 5 is inflated, that is, when the flexible bag 5 becomes large in buoyancy by supplying air thereinto from a pump on the sea and hence is floated on the sea surface.

Reference numeral III designates a position of the fish breeding netted tank 1 taken by it when a horizontal distance from the fish breeding netted tank 1 to its junction point P' with the buoyancy body 16 becomes maximum during the floating movement of the fish breeding netted tank 1 from its position I to its position II.

The anchor 14 is disposed at such a position that length $l_1$, $l_2$ of the mooring cable 15 are determined so as to make an angle $\theta'$ is equal to or larger than right angles even when the fish breeding netted tank 1 arrives at the position III. As a result, the buoyancy body 16 is held under the sea surface even when the fish breeding netted tank 1 floats on the sea surface under the position II. In this case, the mooring cable 15 makes an obtuse angle $\theta''$ at its junction point with the buoyancy body 16.

In the case of changing the condition of the fish breeding netted tank 1 from I to II, if the buoyancy of the floating and sinking mechanism 3 of the fish breeding netted tank 1 is increased so as to decrease the submerged weight $W_0$ of the fish breeding netted tank 1, the existing forces subjected to the fish breeding netted tank 1 become unbalanced. As a result, the tension T produced due to the buoyancy body 16 causes the fish breeding netted tank 1 to rise and causes the angle $\theta$ to increase, thereby decreasing the tension T to a tension $T_1$. Thus, the submerged weight $W_0$ of the fish breeding netted tank 1 becomes balanced with the tension $T_1$ at any depth, so that the fish breeding netted tank 1 is held at a desired depth.

As described above, if the submerged weight $W_0$ of the fish breeding netted tank 1 becomes decreased, the point P is displaced along an arc having a center at the anchor 14 and a radius $l_2$. As a result, the angle $\theta$ is changed through $\theta'$ to $\theta''$ in a continuous and smooth manner. The forces subjected to the fish breeding netted tank 1 become balanced at respective stages from I to II, so that it is possible to stop the floating movement of the fish breeding netted tank 1 at any desired depth. Conversely, in the case of sinking the fish breeding netted tank 1 from the condition II to the condition I, it is also possible to stop the sinking movement of the fish breeding netted tank 1 at any desired depth.

In addition, the speed of supplying and removing air to and from the flexible bag 5 can be controlled so as to freely control the floating and sinking speed of the fish breeding netted tank 1.

FIG. 7 shows another embodiment of a fish breeding netted tank according to the invention. Referring to FIG. 7, reference numeral 51 designates a tubular frame composed of a tube having a large ratio of an outer diameter to thickness and formed of synthetic resin, preferably composed of a flexible reinforced rubber hose including a reinforcing cord 51a embedded in rubber. In the present embodiment, the tubular frame 51 is of annular shape. 52 shows a netted body suspended from the tubular frame 51 and formed of a fishing net, wire net or the like. The netted body 52 constitutes not only the side surface of a fish breeding netted tank 53 but also the base surface as well as the upper surface thereof. Reference numeral 54 illustrates ropes for making the configuration of the netted body 52 constant. The ropes 54 are formed of fiber and suspended from equidistant points along the annular tubular frame 51 and provided at respective lower ends with weights 55 which are also supported by the bottom of the netted body 52. The weights 55 are composed of circular rods or the like. The weights 55 function to prevent the fishing net from being shrunk toward the lower center thereof due to its own weight.

The inner structure of the tubular frame 51 will now be described with reference to FIGS. 8a and 8b. Referring to FIGS. 8a and 8b, reference numeral 56 designates a flexible tube inserted into the tubular frame 51 and adapted to be filled up with water. Air is sealed under pressure in a space 57 formed between the inner periphery of the tubular frame 51 and the outer periphery of the flexible tube 56. The flexible tube 56 is filled with water such as sea water or the like supplied from a pump (not shown) on the sea through a water supply tube 58 and preferably through an annular water distributing tube 59 as shown in FIG. 7.

The annular water distributing tube 59 may be arranged outside the tubular frame 51 as shown in FIG. 7 or arranged below it as shown in FIG. 9. The annular water distributing tube 59 is connected through a plurality of T type couplings 60 located at several portions of the annular water distributing tube 59 to the double tube coupling 61 provided for the tubular frame 51.

In FIG. 7, reference numeral 62 designates a mooring cable for mooring the fish breeding netted tank 53 to the sea-bottom, 63 a water drain pipe and 63' a water drain valve.

FIG. 10 shows the double tube coupling 61 in an enlarged scale, partly shown in section. The double tube coupling 61 is composed of an inner shell 66 provided at its center with a tapped opening 66a adapted to be threadedly engaged with the T type coupling 60 and an outer shell 67 concentrically surrounding the inner shell 66. The inner and outer shells 66 and 67 are provided at their outer ends with inner and outer nipples 66b and 67a, respectively.

The inner nipple 66b is provided at its outer periphery with teeth like indentations adapted to be threadedly engaged with the end of the flexible tube 56. A wire 71 is tightly wound around the end portion of the flexible tube 56 so as to prevent leakage of air therethrough.

In addition, the outer nipple 67a is provided at its outer periphery with teeth-like indentations adapted to be threadedly engaged with the end of the reinforced hose for constituting the tubular frame 51. The outer nipple 67a and the end of the tubular frame 51 are firmly secured into one integral body by means of a clamping ring 68 and a bolt 70 extending through bosses 69, 69 secured to the outer periphery of the clamping ring 68. The clamping ring 68 is also provided at its inner periphery with sawteeth-like indentations, so that even when the flexible tube 56 is filled with water and hence the internal pressure of the tubular frame 51 is increased, there is no risk of both the tubular frame 51 and the flexible tube 56 being removed from the double tube coupling 61.

As described above, both the tubular frame 51 and the flexible tube 56 are firmly united with the double tube coupling 61, so that it is a matter of course that the air 57 filled in the annular space formed between the tubular frame 51 and the flexible tube 56 is not leaked from the annular space even if the air 57 is subjected to the high pressure produced when the flexible tube 56 is filled with water and hence becomes expanded.

The floating and sinking mechanism of the present embodiment of an apparatus for floating and sinking fish breeding netted tanks according to the invention will now be described.

FIG. 8a shows the tubular frame 51 in section when the fish breeding netted tank is floated on the sea surface. In this case, the inner volume of the tubular frame 51 is mainly occupied by the air 57 under pressure. The buoyancy subjected to the fish breeding netted tank 53 is larger than its weight, so that the fish breeding netted tank 53 is floated on the sea surface.

If it is desired to sink the fish breeding netted tank 53, the flexible tube 56 is filled with water as shown in FIG. 8b so as to increase the inner volume of the flexible tube 57 and hence compress the air 57 enclosed in the space surrounding the flexible tube 56. That is, the buoyancy of the fish breeding netted tank 53 is made decreased so as to increase the submerged weight of the fish breeding netted tank 53 which is the remainder obtained by subtracting the buoyancy subjected to the fish breeding netted tank from the weight thereof, thereby sinking the fish breeding netted tank 53.

Air is remained in the water supply tube 58, annular water distributing tube 59 and water drain tube 63. Under such condition, if these tubes are filled with water so as to sink the fish breeding netted tank, these tubes must be filled with water under a considerably high pressure so as to compress the inner air 57, thereby inducing breakage of the water supply tube 58 or the like. In order to eliminate such drawback, the air remained in the water supply tube 58, annular water distributing tube 59 and water drain tube 63 must be removed prior to supply of water into the flexible tube 56.

For this purpose, in the first place, a water drain valve 63' provided for the water drain tube 63 is made open so as to completely remove the remaining air from the annular water distributing tube 59 or the like and then the water drain valve 63' is closed and subsequently water is supplied into the flexible tube 56.

As a result, water filled in the flexible tube 56 causes the sealed air 57 to compress so as to decrease the buoyancy, thereby effectively sinking the fish breeding netted tank 53. After the fish breeding netted tank 53 has been sunk, a water supply valve 58' provided for the water supply tube 58 is closed to maintain the fish breeding netted tank 53 in its submerged condition.

Conversely, in order to float the fish breeding netted tank 53, the valves 58', 63' are made open. As a result, the internal pressure of the compressed sealed air 57 causes the flexible tube 56 to shrink and hence remove water therefrom, and as a result, the sealed air 57 mainly occupies the inner volume of the tubular frame 51. In this way, the buoyancy of the fish breeding netted tank 53 becomes increased, thereby floating it on the sea surface.

In the present embodiment, in the case of supplying water into the flexible tube 56 for the purpose of sinking the fish breeding netted tank 53, water is not directly supplied from the water supply tube 58 into the flexible tube 56, but is supplied from the water supply tube 58 through the annular water distributing tube 59 and plurality of T-type couplings 60 to the flexible tube 56. As a result, it is possible to uniformly fill the flexible tube 56 with water and hence prevent the fish breeding netted tank 53 from inclining due to nonuniform distributions of water. Thus, it is possible to always make the upper surface of the fish breeding netted tank 53 in parallel with the sea surface and sink it under such condition.

In the case of floating the fish breeding netted tank 53, it is also possible to float the fish breeding netted tank 53 with its upper surface held in parallel with the sea surface.

Alternatively, the flexible tube 56 may be filled with air and the annular space formed between the flexible tube 56 and the tubular frame 51 may be filled with water so as to adjust the buoyancy of the fish breeding netted tank 53.

FIG. 11 shows a further embodiment of an apparatus for floating and sinking fish breeding netted tank according to the invention. In the present embodiment, a vertically extending rod 70 is arranged at the center of a tubular frame 51. To the rod 70 is secured a ceiling portion 52a of the netted body 52. The rod 70 is extended through the base surface of the netted body 52 and provided at its lower end with a weight of 70a. The rod 70 is also provided at its center portion with a float 70b which is supplied with air through a tube 72 and valve 73 from a pump (not shown) on the sea. The weight 70a functions to hold the rod 70 in its vertical direction and the float 70b functions to support the fish breeding netted tank 53 under its submerged condition. The float 70b is so adjusted that when the fish breeding netted tank 53 is on the sea surface, the float 70b is located at a position substantially directly below the water surface, thereby separating the ceiling portion 52a f the netted body 52 from the water surface.

The rod 70 is preferably provided at its top end with a float 70c. As a result, it is possible to keep the rod 70 in its vertical direction when the fish breeding netted tank is sunk toward the sea bottom, thereby making the space in the fish breeding netted tank 53 the maximum in volume.

The ceiling portion 52a of the netted body 52 is supported by ropes 54 which are connected at their outer ends to the tubular frame 51 and connected in common at their inner ends to the upper end of the rod 70 and which are hanging freely from both the tubular frame 51 and the upper end of the rod 70 in the form of a catenary curve. The use of such catenary curve shaped ropes 54 provides a netted body 52 whose ceiling portion 52a is conical in shape and connected to one point 70a located at the top end of the rod 70.

As stated hereinbefore, the apparatus for floating and sinking fish breeding netted tanks according to the invention is capable of always holding a buoyancy body under submerged condition, making the buoyancy of the buoyancy body constant and hence rising and lowering a fish breeding netted tank in a continuous and smooth manner in response to change in weight of the fish breeding netted tank under water, and holding the fish breeding netted tank at a constant depth.

As a result, it is possible to significantly broaden a range of field in which the fish breeding netted tank is used in the ocean.

In addition, the apparatus for floating and sinking fish breeding netted tanks according to the invention has a number of advantages. In the first place, the use of a longitudinally elongate flexible bag makes it possible to change its configuration under water and hence increase or decrease its buoyancy, and as a result, the fish breeding netted tank can be floated and sunk in a stable and smooth manner without oscillating it during rising and lowering movement thereof. Secondly, since a tubular frame is provided therein with a flexible tube and gas under pressure is sealed in a space formed between the tubular frame and the flexible tube and water is introduced into and removed from the flexible tube so as to increase or decrease the weight under water of the fish breeding netted tank and hence to float or sink it, the pressure of the gas under pressure sealed in the tubular frame functions to match its rigidity to the exterior force subjected to the tubular frame and if it is required to float and sink the fish breeding netted tank, the required rigidity of the tubular frame can be increased by using a tube which is only resistant against the pressure of water filled therein, and as a result, it is possible to provide a large tubular frame and hence a large fish breeding netted tank by using a reinforcing hose or any other light material, but without using material having a specially high rigidity. Third, since an air gap is formed between a ceiling portion of a fish breeding netted tank and the water surface, the ceiling portion does not prevent ground-bait from being passing therethrough and, in addition, there is no risk of the ceiling portion being broken by the breeding fishes. Fourth, since the ceiling portion is supported in substantially conical in shape by the top end of a rod arranged at a center of the tublar frame and by the tubular frame and the side wall of the fish breeding netted tank is composed of a netted body, a large fish breeding netted tank can firmly be maintained by the tubular frame irrespective of the influence of wind and waves. Finally, a flexible bag is provided with a simple device such as an exhaust valve, but there is no risk of the flexible bag being broken by excessively large amount of air supplied therein by mistake, thereby floating and sinking the fish breeding netted tank in a safe manner.

What is claimed is:

1. An apparatus for floating and sinking fish breeding netted tanks comprising a fish breeding netted tank body totally covered with a netted body; anchors disposed on the sea-bottom; mooring cables connecting said anchors to said fish breeding netted tank; buoyancy bodies each connected to an intermediate portion of said mooring cable and always holding said intermediate portion of said mooring cable under the sea surface; said anchors being disposed outwardly of said netted tank body and said buoyancy bodies such that the portion of each mooring cable between each anchor and each buoyancy body is disposed at an acute angle to a vertical line extending downwardly from each buoyancy body during raising and lowering of said netted tank body; a floating and sinking mechanism secured to said fish breeding netted tank body and adapted to supply fluid into said fish breeding netted tank body and removing said fluid therefrom, said floating and sinking mechanism controlling the depth and raising and lowering speeds of said fish breeding netted tank with the buoyancy of said buoyancy bodies kept in balance with the weight under water of said fish breeding netted tanks.

2. The apparatus accouding to claim 1 wherein said floating and sinking mechanism is composed of an elongate flexible bag extending in a vertical direction and secured to said netted body, said bag being adapted to be supplied with gas and to have said gas removed therefrom and expanded and contracted, and a piping connecting said flexible bag to a pump on the sea surface.

3. The apparatus according to claim 1, wherein said floating and sinking mechanism comprises a tubular frame with gas under pressure sealed therein and suspending said netted body therefrom; a flexible tube concentrically arranged in said tubular frame and adapted to be supplied with water and to have water removed therfrom; and a water supply and drain tube connected to said flexible tube.

4. The apparatus according to claim 3 and comprising further a vertically extending rod arranged at the center of said tubular frame and supporting a ceiling portion of said netted body; and a float secured to said rod and supporting said rod under water.

5. The apparatus according to claim 2, wherein said flexible bag is provided with an exhaust valve for preventing said flexible bag from excessively expanding.

* * * * *